(12) United States Patent
Daikokuya et al.

(10) Patent No.: US 8,533,527 B2
(45) Date of Patent: Sep. 10, 2013

(54) RAID-GROUP CONVERTING APPARATUS AND METHOD

(75) Inventors: Hidejirou Daikokuya, Kawasaki (JP); Mikio Ito, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 12/654,168

(22) Filed: Dec. 11, 2009

(65) Prior Publication Data
US 2010/0095150 A1    Apr. 15, 2010

Related U.S. Application Data

(63) Continuation of application No. PCT/JP2007/061914, filed on Jun. 13, 2007.

(51) Int. Cl.
*G06F 11/00*    (2006.01)
(52) U.S. Cl.
USPC ............................ 714/6.22; 714/6.24; 714/6.2
(58) Field of Classification Search
USPC ......................................... 714/6.22, 6.2, 6.24
See application file for complete search history.

(56) References Cited

U.S. PATENT DOCUMENTS

2006/0085593 A1* 4/2006 Lubbers et al. ............... 711/114
2008/0276057 A1* 11/2008 Hetzler ......................... 711/159

FOREIGN PATENT DOCUMENTS

| JP | 08-30402 | 2/1996 |
|----|----------|--------|
| JP | 2005-258866 | 9/2005 |
| JP | 2006-120120 | 5/2006 |
| JP | 2006-318017 | 11/2006 |

OTHER PUBLICATIONS

International Search Report for corresponding International Application PCT/JP2007/061914; mailed Sep. 11, 2007.

* cited by examiner

*Primary Examiner* — Sarai Butler
(74) *Attorney, Agent, or Firm* — Staas & Halsey LLP (57) ABSTRACT

A RAID-group converting apparatus converts two RAID groups into one RAID group. The RAID-group converting apparatus includes: a data-reading unit that reads at least non-parity data from data including the non-parity data and parity data, for each stripe from a plurality of recording media belonging to the two RAID groups; a parity-generating unit that generates two parities using the data belonging to a same stripe read by the data-reading unit; and a parity-writing unit that writes the two parities generated by the parity-generating unit into a parity storage area belonging to the same stripe.

16 Claims, 6 Drawing Sheets

RAID-GROUP CONVERTING APPARATUS AND METHOD

CROSS-REFERENCE TO RELATED APPLICATION(S)

This application is a continuation of International Application No. PCT/JP2007/061914, filed on Jun. 13, 2007, the entire contents of which are incorporated herein by reference.

FIELD

The embodiments discussed herein are related to a RAID-group (redundant array of inexpensive disks group) converting apparatus, a RAID-group converting method, and a RAID-group converting program.

BACKGROUND

As information technology advances, more and more information is handled by computer systems, which has led to a rapid increase in capacity of disks for storing the information. As the capacity of disks has increased, the problem of data loss upon disk breakdowns has become more serious. RAID is a known technology for preventing data loss caused by disk errors. There are several RAID levels. The most widely used levels are RAID1, RAID4, and RAID5, and these RAID levels can overcome a breakdown in up to one disk. In contrast, RAID6 uses two parities for each stripe and can overcome a breakdown in up to two disks. Therefore, breakdown immunity with a plurality of disks can be guaranteed by disk management under RAID6, which can overcome a breakdown in up to two disks, instead of RAID1, RAID4, and RAID5, which can overcome a breakdown in up to one disk.

Therefore, if a RAID group managed in a RAID1, RAID4, or RAID5 level can be easily changed into a RAID group under a RAID6 level, breakdown immunity with a plurality of disks can be easily improved. There has been a conventional technology for changing a RAID level, e.g., a technology for changing a RAID level by adding a new disk (see Japanese Laid-Open Patent Publication No. 2006-120120), and a technology for changing a RAID level by transferring data to a newly prepared RAID group (see Japanese Laid-Open Patent Publication No. 2006-318017).

With the technology disclosed in Japanese Laid-Open Patent Publication No. 2006-120120, a disk has to be newly added and, with the technology disclose in Japanese Laid-Open Patent Publication No. 2006-318017, an area for storing data for a post-change RAID group has to be prepared in a disk. Therefore, these conventional technologies are not suitable and cannot change a RAID group under the environment with a limited number of disks, e.g., when users cannot afford a disk, or when there is not enough space for installing a disk in an apparatus.

SUMMARY

According to an aspect of an embodiment, a RAID-group converting apparatus converts two RAID groups into one RAID group. The RAID-group converting apparatus includes: a data-reading unit that reads at least non-parity data from data including the non-parity data and parity data, for each stripe from a plurality of recording media belonging to the two RAID groups; a parity-generating unit that generates two parities using the data belonging to a same stripe read by the data-reading unit; and a parity-writing unit that writes the two parities generated by the parity-generating unit into a parity storage area belonging to the same stripe.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

Preferred embodiments of a RAID-group converting apparatus, a RAID-group converting method, and a RAID-group converting program in accordance with the present invention are explained in detail with reference to accompanying drawings.

Figure 1:
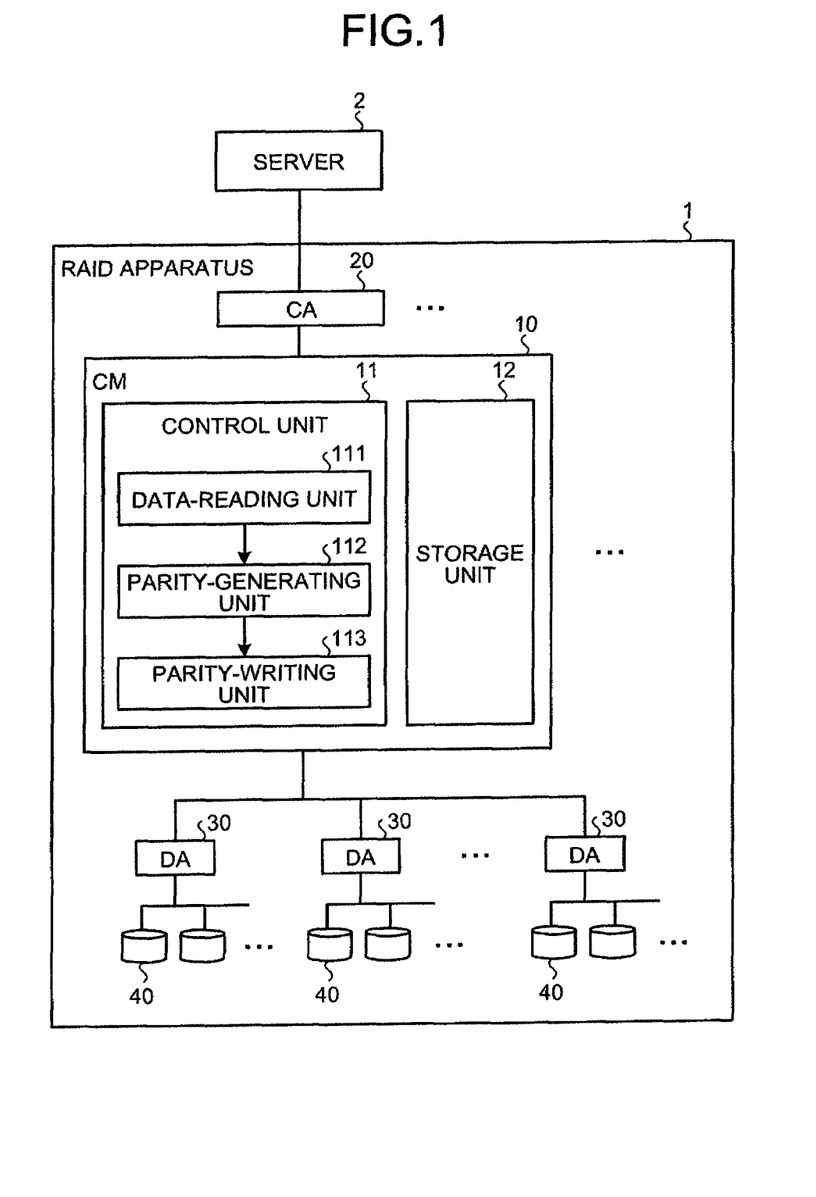
FIG. 1 is a configuration diagram of a RAID apparatus.

Firstly, a configuration of a RAID apparatus of the present embodiment is described. FIG. 1 is a configuration diagram of a RAID apparatus. The RAID apparatus 1 is a storage apparatus for managing a plurality of disks (i.e., recording media) belonging to a RAID group. RAID is a technology for management of disks and can improve performance by preventing data loss caused by disk breakdowns. There are several RAID levels, from RAID0 to RAID6.

For example, RAID1 is a level in which data is written into two disks simultaneously and referred to as mirroring. RAID4 is a level in which a parity exclusive disk is added to striping, i.e., storing data among a plurality of disks in a stripe, and each stripe has a parity. RAID5 is different from RAID4 in a manner such that, in RAID5, a parity for each stripe is dispersed and stored among all disks so that I/O focused on the parity exclusive disk in RAID4 can be avoided. RAID6 is a level in which two parities are generated for each stripe and these parities are dispersed and stored on different disks so that in breakdowns in up to two disks belonging to the same RAID group can be overcome.

The RAID apparatus in accordance with the present embodiment is characterized in a RAID-group converting function for converting two RAID groups managed in the RAID levels, RAID1, RAID4, or RAID5, into a RAID group managed in RAID6. In the present embodiment, for convenience of description, two RAID groups managed in RAID5 are converted into a RAID group managed in RAID6. Two pre-conversion RAID levels (RAID1, RAID4, or RAID5) and the number of disks constituting two RAID groups may be arbitrarily configured.

As depicted in FIG. 1, the RAID apparatus 1 includes a CA (Channel Adapter) 20 that controls a connection with a server 2, a CM (Controller Module) 10 that controls I/O and the like of data stored in disks 40, a DA (Device Adapter) 30 that controls a connection between the CM 10 and the disks 40, and the disks 40 belonging to a RAID group. The CM 10 includes a control unit 11 and a storage unit 12. The control unit 11 includes a data-reading unit 111, a parity-generating unit 112, and a parity-writing unit 113.

Figure 2:
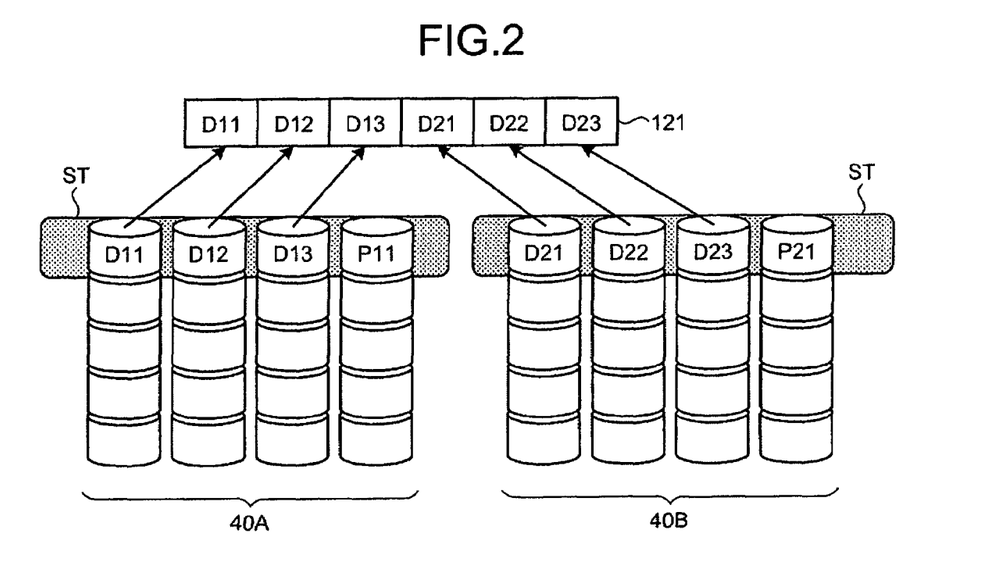
FIG. 2 is a schematic diagram for illustrating a data-reading function of a data reading unit.

The data-reading unit 111 reads data, excluding parities, for each stripe from a plurality of disks belonging to two RAID groups. The data-reading unit 111 is described in detail with reference to FIG. 2. FIG. 2 is a schematic diagram for illustrating a data-reading function of a data-reading unit. As depicted in FIG. 2, data D11, D12, D13, D21, D22, and D23 excluding parities P11 and P21 of data belonging to a stripe ST, which is in two RAID groups 40A and 40B managed in RAID5, are temporarily stored in a data buffer area 121 in the storage unit 12. Thus, the data-reading unit 111 reads D11, D12, D13, D21, D22, and D23 excluding parities P11 and P21 belonging to a stripe ST from a plurality of disks 40 belonging to two RAID groups 40A and 40B. That is, the data-reading unit 111 reads at least non-parity data from data including the non-parity data and parity data for each stripe from a plurality of disks belonging to two RAID groups. All stripes in the RAID groups 40A and 40B are selected in turn as the stripe ST, i.e., the reading destination.

Figure 3:
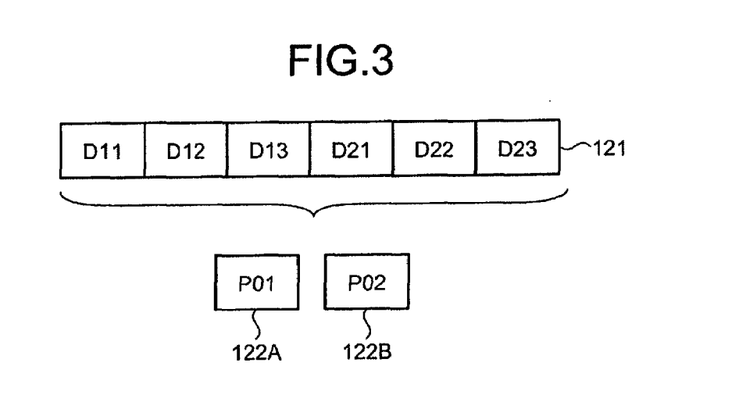
FIG. 3 is a schematic diagram for illustrating a parity-generating function.

The parity-generating unit 112 generates two parities (a horizontal parity P and a weighted parity Q) using data belonging to the same stripe read by the data-reading unit 111. The parity-generating unit 112 is described in detail with reference to FIG. 3. FIG. 3 is a schematic diagram for illustrating a parity-generating function of the parity-generating unit. In FIG. 3, two parities P01 and P02 are generated using data D11, D12, D13, D21, D22, and D23 stored in the data buffer area 121 in the storage unit 12. Thus, the parities P01 and P02 are temporarily stored in the parity buffer area 122A and 122B of the storage unit. The parity-generating unit 112 generates two parities P01 and P02 using data D11, D12, D13, D21, D22, and D23 belonging to a stripe ST read by the data-reading unit 111.

Figure 4:
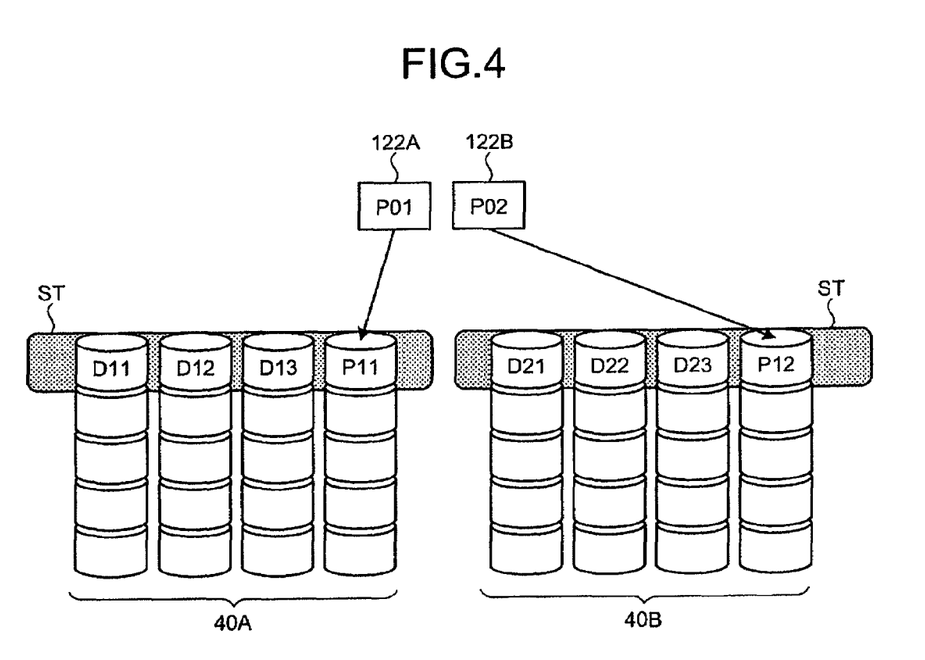
FIG. 4 is a schematic diagram of a parity-writing function of a parity writing unit.

The parity-writing unit 113 writes the two parities generated by the parity-generating unit 112 into a parity storage area in the same stripe as the data storage area storing the original data of the parities. The parity-writing unit 113 is described in detail with reference to FIG. 4. FIG. 4 is a schematic diagram for illustrating a parity-writing function of a parity-writing unit. In FIG. 4, two parities P01 and P02 generated by the parity-generating unit 112 are written into a parity storage area that stores parities P11 and P21 and is in a storage area belonging to a stripe ST in two RAID groups 40A and 40B managed in RAID5. Thus, the parity-writing unit 113 writes two parities P01 and P02 into a parity storage area belonging to the same stripe as the data storage area storing the original data D11, D12, D13, D21, D22, and D23 of the parities P01 and P02.

To execute a RAID-group converting process of the present embodiment, it is assumed that a disk capacity of each of two pre-change RAID groups is larger than a total data amount of both of data and parities stored in a plurality of disks belonging to the other RAID group. This is because when the two RAID groups are converted into the one RAID group, a number of stripes included in one of the two RAID groups having the greater total data amount becomes a number of stripes of the post-change RAID group. Thus, if the disk capacity of one of the two RAID groups is smaller than the total data amount of the other RAID group, it is not possible to form all of the stripes for the post-change RAID group.

Furthermore, when the total data amounts of the two RAID groups are different from each other, predetermined data are stored in the plurality of disks belonging to one of the two RAID groups with the smaller total data amount to match the total data amounts of the two RAID groups with each other. Because the data in the same stripes of the two RAID groups are used to generate the parities, the total data amounts of the two RAID groups are made to coincide with each other. The predetermined data may be blank data or specific data that is recognizable as the data used to match the total data amounts with each other.

Figure 5:
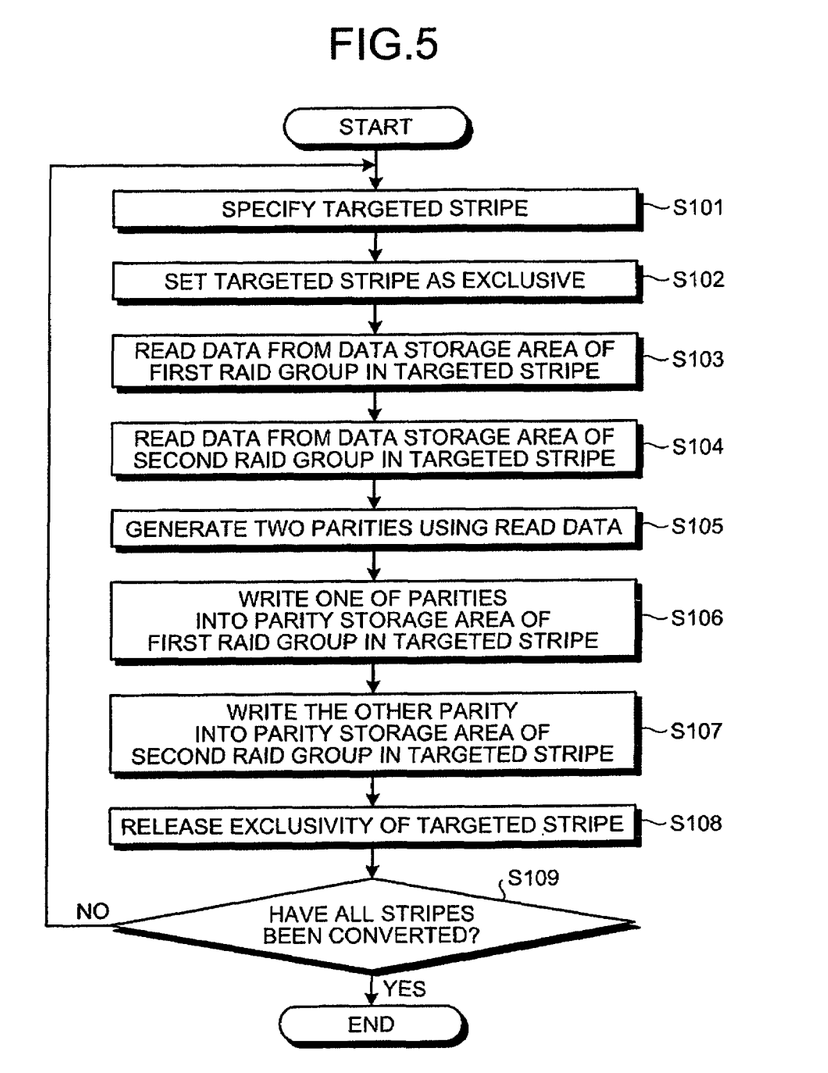
FIG. 5 is a flowchart of a procedure of a RAID-group converting process.

A procedure in the RAID apparatus 1 of the present embodiment is described with reference to FIG. 5. FIG. 5 is a flowchart of a procedure of a RAID-group converting process. This procedure describes a case in which two RAID groups 40A and 40B managed in RAID5 are converted into one RAID group managed in RAID6.

First, the control unit 11 in the RAID apparatus 1 specifies a targeted stripe to be converted (S101) and sets the targeted stripe as exclusive (S102). Then, the data-reading unit 111 in the RAID apparatus 1 reads data from a data storage area of the first RAID group 40A in the targeted stripe (S103) and reads data from a data storage area of the second RAID group 40B in the targeted stripe (S104).

The parity-generating unit 112 in the RAID apparatus 1 generates two parities using the data read by the data-reading unit 111 at above-mentioned S103 and S104 (S105).

The parity-writing unit 113 in the RAID apparatus 1 writes one of the two parities generated by the parity-generating unit 112 at above-mentioned S105 into a parity storage area of the first RAID group 40A in the targeted stripe (S106) and writes the other parity into a parity storage area of the second RAID group 40B in the targeted stripe (S107).

Then, the control unit 11 in the RAID apparatus 1 releases the exclusivity of the targeted stripe (S108) and determines whether all stripes have been converted (S109). When the determination result is NO (S109: NO), the process proceeds to above-mentioned S101. When the determination result is YES (S109: YES), the RAID-group converting process is terminated.

As described above, in the RAID apparatus 1 of the present embodiment, two parities are generated using data that is read for each stripe ST from a plurality of disks 40 belonging to the two RAID groups 40A and 40B managed in RAID5, and the two parities are written into a parity storage area in the stripe ST. This allows the RAID groups to be converted into one RAID group managed in RAID6.

Because it is possible to convert the RAID groups managed in RAID5 into a RAID group managed in RAID6 without newly adding a disk, it is possible to perform the conversion of the RAID groups even under the environment where the number of disks to be installed is limited.

Furthermore, because it is possible to convert the RAID groups without transferring data parts, the conversion of the RAID groups involves less burden.

In the embodiment described above, two RAID groups managed in RAID5 are converted into one RAID group managed in RAID6. As described above, however, a combination of the RAID levels (RAID1, RAID4, and RAID5) of two pre-change RAID groups may be arbitrarily selected. When two pre-change RAID groups includes a RAID group managed in RAID1, the RAID-group converting process is performed as described below so that the process may be performed similarly to the above-described case with RAID5.

Figure 6:
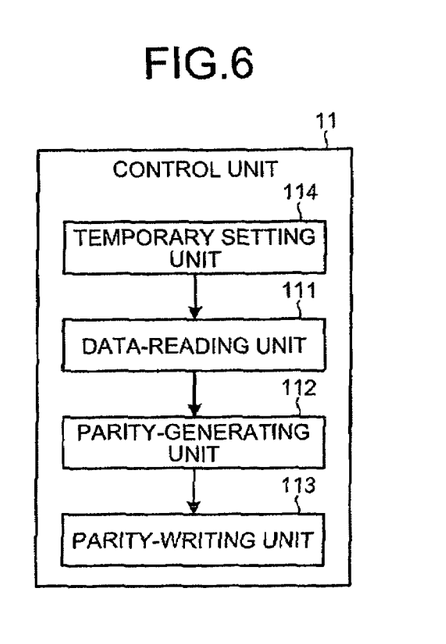
FIG. 6 is a functional configuration diagram of a control unit in accordance with a variation.

Since parities are not used in RAID1, one of two disks managed in RAID1 is temporarily set as a parity exclusive disk so that the RAID-group converting process may be performed similarly to the above-described case with RAID5. A functional configuration of the control unit 11 of the present variation is described with reference to FIG. 6. FIG. 6 is a functional configuration diagram of a control unit of a variation. As depicted in FIG. 6, the functional configuration of the control unit 11 of the present variation is different from that of the control unit 11 of the above-described embodiment in a manner such that the control unit 11 of the present variation includes a temporary setting unit 114 that temporarily sets one of the disks as a parity exclusive disk. Other than the functional configuration of the temporary setting unit 114, the control unit 11 includes the same configuration, and therefore the description is omitted.

The configuration of the RAID apparatus 1 illustrated by the embodiment in FIG. 1 may be modified in various ways without departing from the spirit of the present invention. For example, the same functions as the RAID apparatus 1 may be realized in a manner such that the functions of the control unit 11 in the RAID apparatus 1 are implemented as software and the software is executed by a computer. The following describes an example of a computer that executes a RAID-group converting program 1071 that is a software implementation of the functions of the control unit 11.

Figure 7:
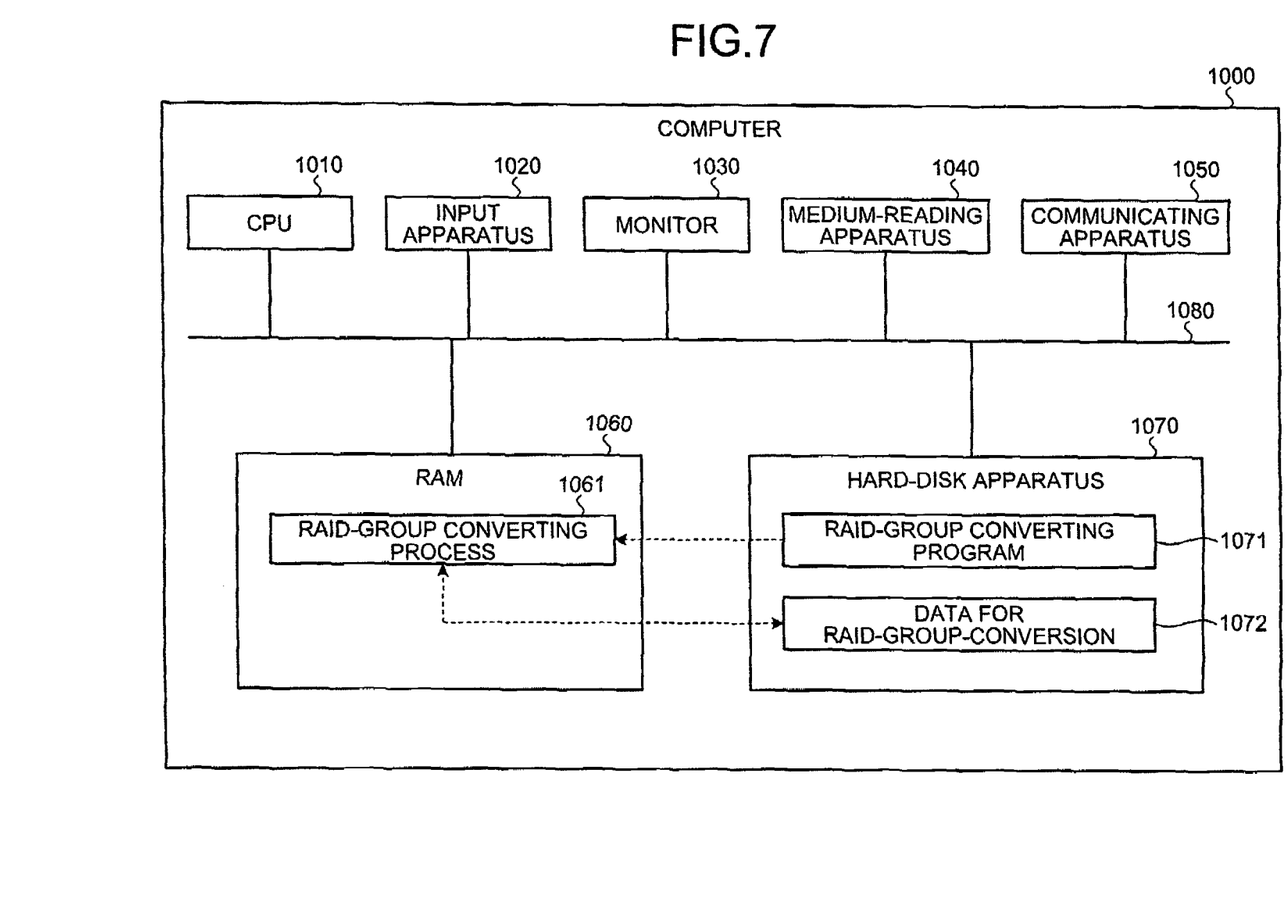
FIG. 7 is a functional configuration diagram of a computer for executing a RAID-group converting program.

FIG. 7 is a functional configuration diagram of a computer for executing a RAID-group converting program. This computer 1000 includes a CPU (Central Processing Unit) 1010 that executes various calculation processes, an input apparatus 1020 that receives data input from users, a monitor 1030 that displays various kinds of information, a medium-reading apparatus 1040 that reads programs and the like from recording media, a transmitting apparatus 1050 that performs transmission/reception of data with other computers via a network, and a RAM (Random Access Memory) 1060 that temporarily stores various kinds of information, and a hard-disk apparatus 1070, and these components are connected together on a bus 1080.

The hard-disk apparatus 1070 stores therein the RAID-group converting program 1071 that has the same functions as the control unit 11 illustrated in FIG. 1, and RAID-group-conversion data 1072 that corresponds to various kinds of data used by the RAID-group converting program 1071. The RAID-group-conversion data 1072 may be dispersed as needed and stored in other computers connected via a network.

The CPU 1010 reads the RAID-group converting program 1071 from the hard-disk apparatus 1070 and loads the program on the RAM 1060. Then, the RAID-group converting program 1071 functions as a RAID-group converting process 1061. The RAID-group converting process 1061 loads, as needed, information and the like read from the RAID-group-conversion data 1072 on its allocated area in the RAM 1060 and performs various data processes based on the loaded data and the like.

The RAID-group converting program 1071 may not be necessarily stored in the hard-disk apparatus 1070. The RAID-group converting program 1071 may be stored in a recording medium such as a CD-ROM, and the RAID-group converting program 1071 may be read and executed by the computer 1000. Furthermore, the RAID-group converting program 1071 may be stored in other computers (or servers) and the like that are connected with the computer 1000 via public lines, the Internet, LAN (Local Area Network), WAN (Wide Area Network), and the like so that the computer 1000 is able to read the RAID-group converting program 1071 from other computers or the like and execute the program.

According to an embodiment of the invention, two parities are generated using data read per stripe from a plurality of recording media belonging to two RAID groups, and the two parities are written into parity storage areas included in each stripe. Accordingly, it is possible to make the conversion into one RAID group having two parities per stripe, and thus to convert the RAID groups without adding any disks or migrating the data portions. Therefore, according to the embodiment, it is possible to convert the RAID groups easily even in an environment restricting the number of mounted disks.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A RAID-group converting apparatus that converts two redundant-array-of-inexpensive-disks (RAID) groups into one RAID group, the RAID-group converting apparatus comprising:
    a data-reading unit that reads at least non-parity data from data including the non-parity data and parity data, for each stripe from a plurality of recording media belonging to the two RAID groups;
    a parity-generating unit that generates two parities using the data belonging to a same stripe read by the data-reading unit; and
    a parity-writing unit that dispersively writes the two parities generated by the parity-generating unit into parity storage areas belonging to the same stripe, and
    wherein the RAID-group converting apparatus converts two RAID groups without adding any disks.

2. The RAID-group converting apparatus according to claim 1, wherein
    the two RAID groups are managed in a first RAID level in which same data are stored in each of a plurality of recording media or in a second RAID level in which each stripe includes one parity, and the one RAID group is managed in a third RAID level in which each stripe includes two parities, and
    the RAID-group converting apparatus further comprises:
    a temporary setting unit that temporarily sets one of a plurality of recording media belonging to a RAID group managed in the first RAID level to be a parity-dedicated recording medium that stores parities, if the two RAID groups include the RAID group managed in the first RAID level.

3. The RAID-group converting apparatus according to claim 2, wherein
    the first RAID level is RAID1;
    the second RAID level is RAID4 or RAID5; and
    the third RAID level is RAID6.

4. The RAID-group converting apparatus according to claim 1, wherein
    a disk capacity of each of the two RAID groups is larger than a total data amount of data and parities stored in the plurality of recording media belonging to the other one of the two RAID group.

5. The RAID-group converting apparatus according to claim 4, wherein
    predetermined data are stored in the plurality of recording media belonging to one of the two RAID groups having the total data amount smaller than that of the other one of the RAID groups to match the total data amounts of the two RAID groups with each other, if the total data amounts of the two RAID groups are different from each other.

6. The RAID-group converting apparatus according to claim 1 comprising:
a temporary setting unit that temporarily sets one of a plurality of recording media belonging to a RAID group managed in a RAID1 level to be a parity-dedicated recording medium that stores parities, when the two RAID groups include the RAID group managed in a RAID1 level.

7. A RAID-group converting method of converting two RAID groups into one RAID group, the RAID-group converting method comprising:
reading at least non-parity data from data including the non-parity data and parity data, for each stripe from a plurality of recording media belonging to the two RAID groups;
generating two parities using the read data belonging to a same stripe; and
dispersively writing the two parities generated into parity storage areas belonging to the same stripe, and
wherein the RAID-group converting method converts two RAID groups without adding any disks.

8. The RAID-group converting method according to claim 7, wherein
the two RAID groups are managed in a first RAID level in which same data are stored in each of a plurality of recording media or in a second RAID level in which each stripe includes one parity, and the one RAID group is managed in a third RAID level in which each stripe includes two parities, and
the RAID-group converting method further comprises:
setting temporarily one of a plurality of recording media belonging to a RAID group managed in the first RAID level to be a parity-dedicated recording medium that stores parities, if the two RAID groups include the RAID group managed in the first RAID level.

9. The RAID-group converting method according to claim 8, wherein
the first RAID level is RAID1;
the second RAID level is RAID4 or RAID5; and
the third RAID level is RAID6.

10. The RAID-group converting method according to claim 7, wherein
a disk capacity of each of the two RAID groups is larger than a total data amount of data and parities stored in the plurality of recording media belonging to the other one of the two RAID group.

11. The RAID-group converting method according to claim 10, wherein
predetermined data are stored in the plurality of recording media belonging to one of the two RAID groups having the total data amount smaller than that of the other one of the RAID groups to match the total data amounts of the two RAID groups with each other, if the total data amounts of the two RAID groups are different from each other.

12. A non-transitory computer readable storage medium having stored therein a RAID-group converting program for converting two RAID groups into one RAID group, the RAID-group converting program causing a computer to execute a process comprising:
reading at least non-parity data from data including the non-parity data and parity data, for each stripe from a plurality of recording media belonging to the two RAID groups;
generating two parities using the read data belonging to a same stripe; and
dispersively writing the two parities generated into parity storage areas belonging to the same stripe, and
wherein the RAID-group converting program converts two RAID groups without adding any disks.

13. The non-transitory computer readable storage medium according to claim 12, wherein
the two RAID groups are managed in a first RAID level in which same data are stored in each of a plurality of recording media or in a second RAID level in which each stripe includes one parity, and the one RAID group is managed in a third RAID level in which each stripe includes two parities, and
the process further comprises:
setting temporarily one of a plurality of recording media belonging to a RAID group managed in the first RAID level to be a parity-dedicated recording medium that stores parities, if the two RAID groups include the RAID group managed in the first RAID level.

14. The non-transitory computer readable storage medium according to claim 13, wherein
the first RAID level is RAID1;
the second RAID level is RAID4 or RAID5; and
the third RAID level is RAID6.

15. The non-transitory computer readable storage medium according to claim 12, wherein
a disk capacity of each of the two RAID groups is larger than a total data amount of data and parities stored in the plurality of recording media belonging to the other one of the two RAID group.

16. The non-transitory computer readable storage medium according to claim 15, wherein
predetermined data are stored in the plurality of recording media belonging to one of the two RAID groups having the total data amount smaller than that of the other one of the RAID groups to match the total data amounts of the two RAID groups with each other, if the total data amounts of the two RAID groups are different from each other.

* * * * *